(12) United States Patent
Kurian et al.

(10) Patent No.: US 12,386,934 B2
(45) Date of Patent: Aug. 12, 2025

(54) CONTINUAL BIOMETRIC AUTHENTICATION

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 193 days.

(21) Appl. No.: 18/224,198

(22) Filed: Jul. 20, 2023

(65) Prior Publication Data
US 2025/0028799 A1    Jan. 23, 2025

(51) Int. Cl.
G06F 21/00    (2013.01)
G06F 21/32    (2013.01)

(52) U.S. Cl.
CPC .................... G06F 21/32 (2013.01)

(58) Field of Classification Search
CPC ........................................ G06F 21/32
See application file for complete search history.

(56) References Cited

U.S. PATENT DOCUMENTS

| | | | | |
|---|---|---|---|---|
| 2002/0091937 A1* | 7/2002 | Ortiz | ...... | H04W 12/06 726/5 |
| 2006/0288234 A1* | 12/2006 | Azar | ...... | G06F 21/316 713/186 |
| 2012/0121140 A1* | 5/2012 | Gerken, III | ...... | G06F 21/32 382/115 |
| 2015/0310444 A1* | 10/2015 | Chen | ...... | G06Q 20/308 705/44 |
| 2015/0347734 A1* | 12/2015 | Beigi | ...... | H04L 9/3268 726/28 |
| 2016/0182503 A1* | 6/2016 | Cheng | ...... | H04W 12/082 726/7 |
| 2019/0342298 A1* | 11/2019 | Chen | ...... | H04L 9/3231 |
| 2020/0053077 A1* | 2/2020 | Merrell | ...... | G06Q 20/40145 |
| 2021/0160687 A1* | 5/2021 | Ross | ...... | G06N 3/044 |
| 2021/0182370 A1* | 6/2021 | Melnikov | ...... | H04W 12/065 |
| 2022/0269800 A1* | 8/2022 | Cui | ...... | G06V 40/172 |
| 2024/0244048 A1* | 7/2024 | Traywick | ...... | H04L 63/0861 |
| 2024/0248972 A1* | 7/2024 | Long | ...... | G06F 21/6245 |

\* cited by examiner

*Primary Examiner* — William A Corum, Jr.
(74) *Attorney, Agent, or Firm* — Weiss & Arons LLP (57) ABSTRACT

Apparatus, methods and systems for continual biometric authentication of a user on a user device is provided. Methods may create, for the user, a biometric authentication reference model. Methods may store the biometric authentication reference model at a database associated with the user device. In response to an instantiation of a session by the user on the user device, methods may execute a continual biometric scan. The scanning may be executed until the session is terminated. Methods may identify a number of comparison points between the scanned and stored biometric identifiers. In response to determining that the number of identified comparison points is below a predetermined threshold number of comparison points, methods may initiate a passcode request. The passcode request may request a confirmation of a preset user-selected passcode. In response to determining that the passcode response does not match the preset user-selected passcode, methods may terminate the session.

15 Claims, 8 Drawing Sheets

CONTINUAL BIOMETRIC AUTHENTICATION

FIELD OF TECHNOLOGY

The field of technology relates to biometric identification.

BACKGROUND OF THE DISCLOSURE

Typical computing devices may include private or sensitive information. The private or sensitive information may not be secure if a non-authenticated user gains access to the computing device. Currently, once an authenticated user uses a biometric identifier to login to a computing device or application, the computing device or application may not be secure from unauthorized access. Additionally, at times, a user may forget to log off from the computing device, thereby enabling unauthorized access to the private and secure information on the computing device.

Biometric identification is generally a secure way of verifying a user's identity. A user may enter a biometric identifier to initiate a secure login into an application operating on the computing device. Once a user has successfully logged into the application, the user identity is not usually re-confirmed during the authenticated session.

As such it would be desirable to provide a system to continually authenticate a user's identity using a continual biometric scan. It would be further desirable to provide such a system that does not interrupt or interfere with the user's activities on the computer device.

SUMMARY OF THE DISCLOSURE

Systems, apparatus and methods for continual biometric authentication of a user on a user device are provided. Methods may include creating, for a user, a biometric-authentication reference model.

The methods may include instantiating an instance of a biometric authentication application on the user device. The user device may be a computing device. The user device may be a desktop computer, laptop, smartphone, tablet, mainframe computer, mobile device or any other suitable user device. The user device may be associated with the user. The biometric authentication application may be an application designed to capture biometric identifiers of the user.

The user device may include one or more sensors. The one or more sensors may be biometric sensors. The one or more sensors may capture biometrics of a user. The one or more sensors may include infrared sensors, ultrasonic sensors, optical sensors, capacitive sensors or any other suitable sensors. The one or more sensors may capture a plurality of biometrics of a user.

In response to an instantiation of the biometric authentication application by the user, the methods may include scanning a plurality of biometric identifiers. The scanning may be executed using the one or more sensors included in the user device. The plurality of biometric identifiers may be associated with the user.

The methods may include combining the scanned plurality of biometric identifiers. The scanned plurality of biometric identifiers may be combined to create the biometric authentication reference model. The biometric authentication reference model may correspond to, or identify, the user. The biometric authentication reference model may include one or more biometric identifiers of the user.

The plurality of biometric identifiers may include a posture model of the user. As such, the one or more sensors may capture a general posture pattern of the user. The biometric authentication application may create a posture model reflecting the posture pattern of the user.

The plurality of biometric identifiers may include a face recognition model of the user. As such, the one or more sensors may capture a picture of the user's face. The biometric authentication model may create a digital signature corresponding to the key landmarks of the user's face. The digital signature may be used to create a face recognition model of the user.

The plurality of biometric identifiers may include a retinal identification model. As such, the one or more sensors may use a low-intensity light source to scan the retina of the user. The biometric authentication application may map the unique patterns of a user's retina to create a retinal identification of the user.

The plurality of biometric identifiers may include a keystroke model of the user. As such, the one or more sensors may capture a typing manner, rhythm and speed of the user. The biometric authentication application may create a keystroke model based on the identified manner, rhythm and speed of the user's keystrokes.

The biometric authentication reference model may include a combination of one or more of a posture model, a face recognition model, a retinal identification model, a keystroke model and any other suitable biometric identifier relating to the user. The biometric authentication reference model may combine the stored biometric identifiers to create a baseline biometric reference. The baseline biometric reference may include the identifiable biometrics of the user from all of the included biometric identifiers as a single reference sample.

The methods may include storing the biometric authentication reference model. The biometric authentication reference model may be stored at a database. The database may be associated with the user device. The biometric authenticator reference model may be stored in any suitable memory location associated with the user device.

In response to the user instantiating a session on the user device, the methods may include executing a continual biometric scan. The session may include a logging in to the user's account. A session may include executing an application. The session may include any suitable action on the user device. The continual biometric scan may use the one or more sensors to capture a plurality of biometrics identifiers of the user. The plurality of biometric identifiers of the user may include a posture model, a face recognition model, a retinal identification model, a keystroke model or any other suitable biometric identifiers. The continual biometric scan may operate periodically until the session is terminated. The continual biometric scan may operate continuously until the session is terminated. The continual biometric scan may operate without intentional/deliberate input from the user.

The methods may include comparing the captured biometric identifiers to the biometric identifiers stored in the biometric authentication reference model. The comparing may include identifying a number of comparison points between the captured biometric identifiers and the stored biometric identifiers. Comparison points may be unique identifiable features within the captured biometrics that match with unique identifiable features within the stored biometric authentication reference model. For example, in a face recognition model, comparison points may include key landmarks of the scanned face recognition model. The methods may include comparing the key landmarks of the captured face recognition model with key landmarks of the stored face recognition model. The key landmarks that are determined to match between the captured face recognition model and the stored recognition model may be comparison points.

The methods may include using an Artificial Intelligence ("AI") model to compare the captured biometric identifiers with the stored biometric identifiers. The AI model may analyze the key landmarks of the captured and stored biometric identifiers and determine if they are a match. The AI model may use machine learning algorithms to compare the captured and stored biometric identifiers.

The comparing may include generating a random generation of the one or more captured biometric identifiers and comparing each biometric identifier with a corresponding stored biometric identifier. For example, the methods may include randomly generating a comparison between a captured face recognition model and a corresponding stored face recognition model. After confirming a match between the scanned and stored face recognition models, the methods may include randomly generating a comparison between a captured keystroke model and a corresponding stored keystroke model. The methods may include randomly generating different comparisons between different biometric identifiers that are captured by the continual biometric scan and corresponding biometric identifiers included in the biometric authentication reference model.

In response to determining that the number of identified comparison points is above a predetermined threshold number of comparison points, the methods may include continually operating the continual biometric scan. The threshold number of comparison points may be a minimum number of comparison points required in order to verify the authentication of the user.

The continual biometric scan may include initiating a first biometric scan. The continual biometric scan may include comparing captured biometric identifiers from the first biometric scan with the stored biometric identifiers from the biometric authentication reference model. In response to determining that the number of comparison points between a captured biometric identifier and a corresponding stored biometric identifier is above the predetermined threshold number of comparison points, the methods may include generating a token. The token may verify the identity of the user. The token may use encrypted, machine-generated codes to verify the user's identity. The token may be valid for a predetermined amount of time. The amount of time for which the token is valid may be pre-selected by the user. The token may be valid for a millisecond. The token may be valid for a second. The token may be valid for a minute. The token may be valid for an hour. The token may be valid for any suitable amount of time.

After the allotted amount of time, the token may timeout. In response to a timeout of the token, the methods may include initiating a second biometric scan. The methods may include continually initiating biometric scans after each token timeout, until the session is terminated.

In response to determining that the number of identified comparison points is below the predetermined threshold number of comparison points, the methods may include initiating a passcode request. The passcode request may request from the user, confirmation of a preset user-selected passcode. The preset user-selected passcode may be stored at the database.

In response to receiving a passcode response from the user, the methods may include comparing a passcode confirmation included in the passcode response with the preset user-selected passcode. In response to determining that the passcode confirmation does not match the preset user-selected passcode, the methods may include terminating the session.

In response to confirming a match of the passcode confirmation to the preset user-selected passcode, the methods may include updating the biometric authentication reference model. The updating may include executing an update instance of the biometric authentication application on the user device. The updating may include scanning, using the one or more sensors included in the user device, a plurality of updated biometric identifiers of the user. The updating may include combining the scanned plurality of updated biometric identifiers to create an updated biometric-authentication reference model. The updating may include storing the updated biometric authentication reference model at the database.

The methods may further include creating for a first user a first biometric authentication reference model. The methods may include executing a first instance of the biometric authentication application on the user device. The user device may be associated with both the first user and a second user. The methods may include scanning, using the user device, a first plurality of biometric identifiers of the first user. The methods may include combining the first plurality of biometric identifiers to create the first biometric authentication reference model. The methods may include storing the first biometric authentication reference model at the database.

The methods may further include creating for the second user a second biometric authentication reference model. The methods may include creating, for the second user, a second biometric authentication reference model. The methods may include executing a second instance of the biometric authentication application on the user device. The methods may include scanning, using the user device, a second plurality of biometric identifiers of the second user. The methods may include combining the second plurality of biometric identifiers to create the second biometric authentication reference model. The methods may include storing the second biometric authentication reference model at the database.

In response to an instantiation of a session on the user device, the methods may include determining that the session was initiated by the first user. The determining that the session was initiated by the first user may include receiving a passcode message from a user. The passcode message may include a passcode specific to the first user. The determining may include comparing the passcode, included in the passcode message, with a stored passcode reference of the first user. In response to identifying that the passcode included in the passcode message matches the stored passcode reference, the methods may include authenticating that the user is a first user.

In response to determining that the session was initiated by the first user, the methods may include initiating a first continual biometric comparison. The first comparison may include comparing captured biometric identifiers of the user to the stored first plurality of biometric identifiers. The first comparison may include determining a number of comparison points between the captured biometric identifiers and the stored first plurality of biometric identifiers.

The methods may include determining when the second user has replaced the first user. The determining that the second user has replaced the first user may include detecting that the number of comparison points between the captured biometric identifiers of the user and the first plurality of biometric identifiers is below the predetermined threshold number of comparison points. The determining may include initiating a second biometric scan of the user. The determining may include comparing a captured biometric identifier from the second biometric scan with a biometric identifier from the second plurality of stored biometric identifiers. In response to detecting that a number of comparison points between the captured biometric identifier and the stored biometric identifier from the second plurality of biometric identifiers is above the predetermined threshold number of comparison points, the methods may include determining that the second user has replaced the first user.

In response to determining that the second user has replaced the first user during the session, the methods may include initiating a second continual biometric comparison. The second comparison may include comparing captured biometric identifiers of the second user to the stored second plurality of biometric identifiers.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Apparatus, methods and systems for continual biometric authentication of a user on a user device are provided. The apparatus may include a user device. The user device may be a computing device. The user device may be a desktop, laptop, mainframe computer, tablet, smartphone, mobile device or any other suitable computing device.

The user device may include a processor. The processor may include hardware. The processor include software. The processor may provide instructions and processing capabilities for use by the user device. The user device may include one or more sensors. The one or more sensors may include optical sensors, infrared sensors, ultrasonic sensors, capacitive sensors, motion sensors or any other suitable sensors. The sensors may be in electronic communication with the processor. The one or more sensors may be used to capture biometric identifiers of a user.

For example, the plurality of biometric identifiers may include a posture model of the user. The one or more sensors may capture a general posture pattern of the user. As such, the biometric authentication application may create a posture model reflecting the posture pattern of the user.

The plurality of biometric identifiers may include a face recognition model of the user. As such, the one or more sensors may capture a picture of the user's face. The biometric authentication model may create a digital signature corresponding to the key landmarks of the user's face.

The plurality of biometric identifiers may include a retinal identification model. As such, the one or more sensors may use a low-intensity light source to scan the retina of the user. The biometric authentication application may map the unique patterns of a user's retina to create a retinal identification model of the user.

The plurality of biometric identifiers may include a keystroke model of the user. As such, the one or more sensors may capture a typing manner, rhythm and speed of the user. The biometric authentication application may create a keystroke model based on the identified manner, rhythm and speed of the user's keystrokes.

The user device may include an authentication model. The authentication model may be executed through the processor. The authentication model may include one or more algorithms programmed to create a biometric authentication reference model of the user. The authentication model may execute a biometric authentication application. The biometric authentication application may execute a scan of a plurality of biometric identifiers of the user. The biometric authentication application may execute the scan in response to a prompt from the user. The one or more sensors may scan the plurality of biometric identifiers of the user. The biometric authentication model may combine the plurality of biometric identifiers to create a biometric authentication reference model of the user.

The user device may be associated with a database. The database may be a component of the user device. The database may be external to the user device. The database may be stored on the cloud. The user device may be in electronic communication with the database. The user device may connect to the database through Transmission Control Protocol/Internet Protocol ("TCP/IP"). The biometric authentication model may store the biometric authentication reference model at the database.

The processor may instantiate a session at the user device. The session may be initiated by the user. In response to an instantiation of the session by the user, the processor may instruct the one or more sensors to execute a continual biometric scan. The continual biometric scan may execute a continual scan until the session is terminated. The processor may instruct the one or more sensors to initiate the continual biometric scan without intentional/deliberate input from the user. The one or more sensors may capture a plurality of biometric identifiers of the user.

The processor may receive from the one or more sensors captured biometric identifiers of the user. The processor may execute an algorithm to compare the scanned biometric identifiers to the biometric identifiers stored in the biometric authentication reference model. The algorithm may include an Artificial Intelligence ("AI") model. The AI model may be used to compare the scanned biometric identifiers to the biometric identifiers stored in the biometric authentication reference model.

The processor may generate a random generation of one of the one or more captured biometric identifiers. The processor may use the algorithm with the AI model to compare the randomly selected captured biometric identifier with a corresponding stored biometric identifier. For example, the processor may randomly generate a comparison between the captured and stored face recognition model. After confirming a match between the captured and stored face recognition model, the processor may randomly generate a comparison between the stored and captured keystroke model. The processor may randomly generate different comparisons between different biometric identifiers that are captured by the continual biometric scan and biometric identifiers stored in the biometric authentication reference model.

The algorithm along with the AI model may identify a number of comparison points between the captured biometric identifiers and the stored biometric identifiers. Comparison points may be unique identifiable features within the captured biometrics that match with unique identifiable features within the stored biometric authentication reference model. For example, in a face recognition model, comparison points may include key landmarks of the scanned face recognition model. The methods may include comparing the key landmarks of the captured face recognition model with key landmarks of the stored face recognition model. The key landmarks that are determined to match between the captured face recognition model and the stored recognition model may be comparison points.

When the number of identified comparison points is greater than the predetermined threshold number of comparison points, the processor may generate a token. The token may verify the identity of the user. The token may use encrypted, machine-generated codes to verify the user's identity. The token may be valid for a predetermined amount of time. The amount of time the token is valid for may be pre-selected by the user. The token may be valid for a millisecond. The token may be valid for a second. The token may be valid for a minute. The token may be valid for an hour. The token may be valid for any suitable amount of time.

After the allotted amount of time, the token may timeout. In response to a timeout of the token, the processor may initiate a second biometric scan. The processor may continually execute biometric scans after each token timeout, until the session is terminated.

When the number of identified comparison points is determined by the algorithm to be below a predetermined threshold number, the processor may initiate a passcode request. The passcode request may be initiated on a graphical user interface ("GUI"). The GUI may be included in the user device. The passcode request may be initiated to confirm a preset user-selected passcode stored at the database.

In response to an input of a passcode response on the GUI by the user, the processor may execute an algorithm to compare the passcode response with the preset user-selected passcode. The processor may continue the session in response to determining that the passcode matches the preset user-selected passcode. In response to determining that the passcode matches the preset user-selected passcode, the processor may update the stored biometric authentication reference model. The processor may terminate the session in response to determining that the passcode response does not match the preset user-selected passcode.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
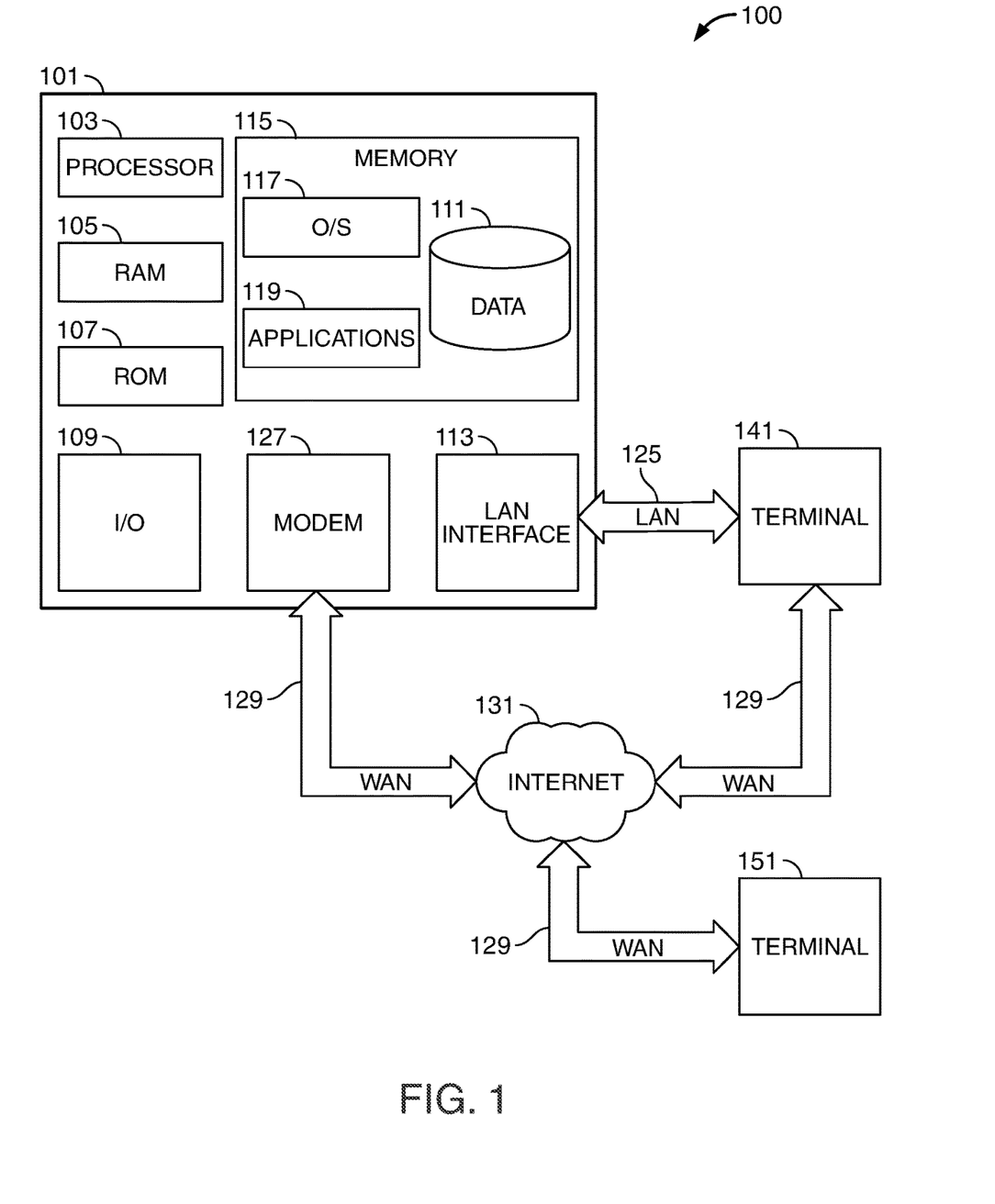
FIG. 1 shows an illustrative diagram in accordance with principles of the invention.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the user device, database, artificial intelligence ("AI") model, sensors, and processor may include one or more components of system 100.

Computer 101 may have a processor 103 for controlling the operation of the device and its associated components and may include RAM 105, ROM 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text and/or audio assistance files. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. Connections between System 100 and Terminals 151 and/or 141 may be used for the user device to communicate with external devices such as the database.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS) and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
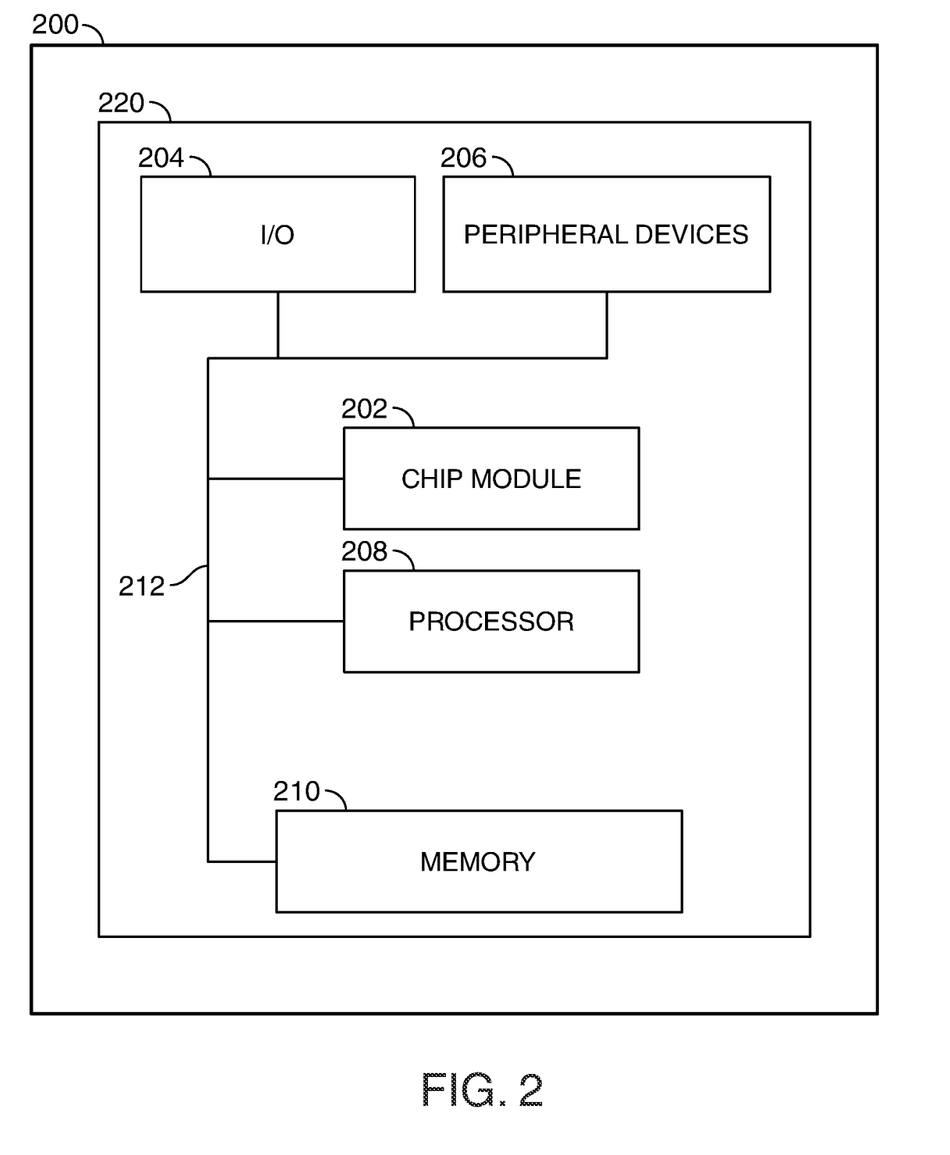
FIG. 2 shows another illustrative diagram in accordance with principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
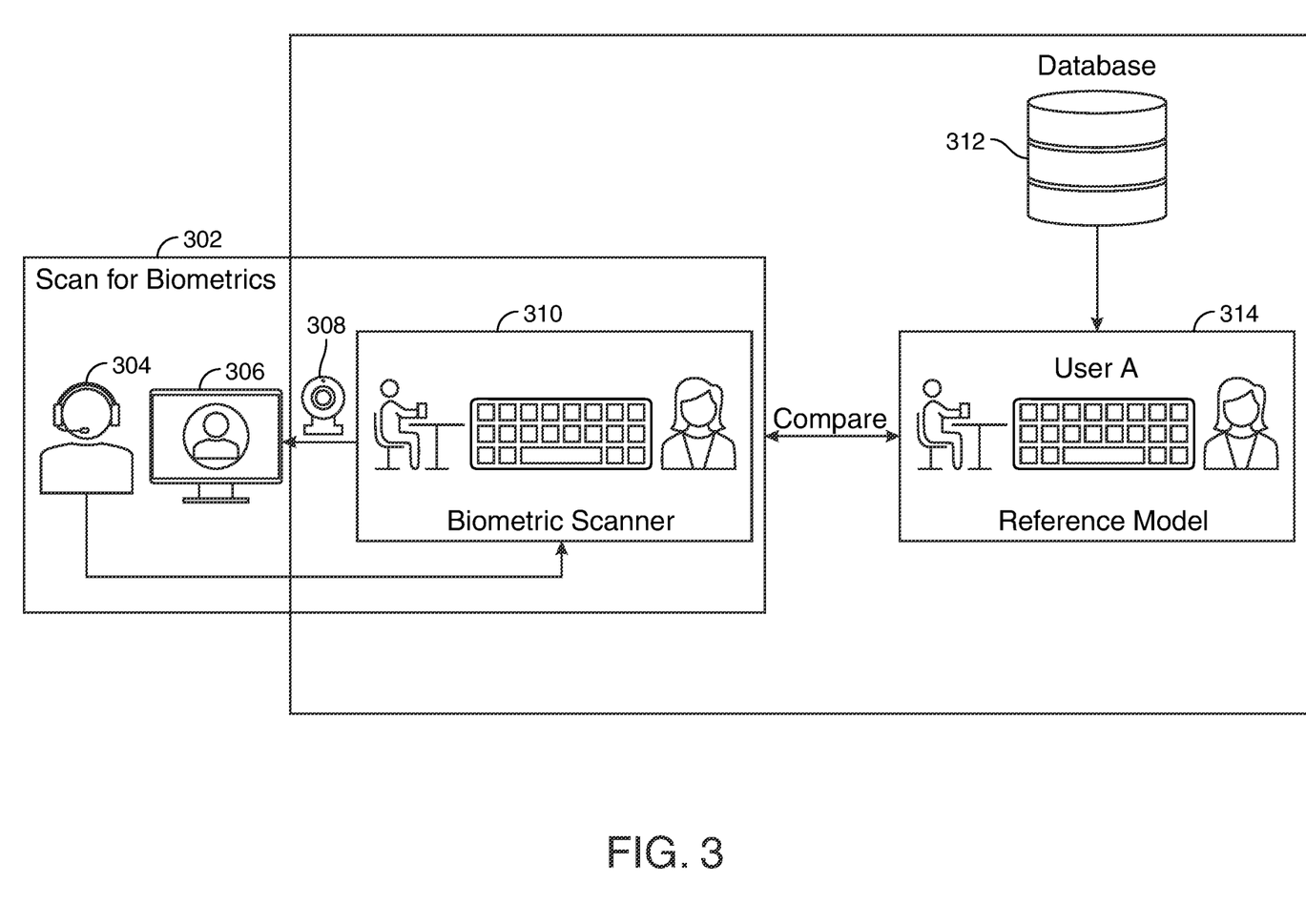
FIG. 3 shows yet another illustrative diagram in accordance with principles of the invention.

FIG. 3 shows an illustrative view of system 300. System 300 may include user 304. User 304 may instantiate a session at node 306. Node 306 may be a laptop, desktop, mainframe computer, tablet, smartphone, mobile device or any other suitable computing device. Node 306 may include a processor. The processor may be configured to perform algorithms and calculations needed to operate node 306. In response to an instantiation of a session by user 304, biometric scanner 310 may begin a continual biometric scan of user 304. Biometric scanner 310 may be included in node 306. Biometric scanner 310 may be an application included in node 306. Biometric scanner 310 may be executed by the processor. Biometric scanner 310 may include an Artificial Intelligence ("AI") model. Biometric scanner 310 may include one or more sensors 308. Sensors 308 may include infrared sensors, ultrasonic sensors, optical sensors, capacitive sensors and/or any other suitable sensors.

Using sensors 308, biometric scanner 310 may capture biometrics identifiers of user 304. The biometric identifiers may include posture model, retinal identification model, facial recognition model, keystroke model or any other suitable biometric identifiers. Biometric scanner 310 may compare the captured biometrics with biometric identifiers included in biometric authentication reference model 314. Biometric authentication reference model 314 may correspond to user 304. User 304 may create biometric authentication reference model 314 using a biometric authentication application. Biometric authentication reference model 314 may be stored at database 312. Biometric authentication reference model 314 may include baseline biometric identifiers of user 304.

Biometric scanner 310 may compare captured biometrics of user 304 to the stored biometrics included in biometric authentication reference model 314. The comparison may be executed in real time. The comparison may include comparing one captured biometric identifier with a corresponding stored biometric identifier. The one captured biometric identifier selected for the comparison may be randomly generated. The comparison may include identifying a number of comparison points between the one captured biometric identifier and the corresponding stored biometric identifier. In response to determining that the number of comparison points is greater than a threshold number of comparison points, biometric scanner 310 may compare another captured biometric identifier with a corresponding biometric identifier stored in biometric authentication reference model 314. Biometric scanner 310 may continue to compare captured biometric identifiers with corresponding biometric identifiers stored in biometric authentication model 314 until the session at node 304 terminates.

Figure 4:
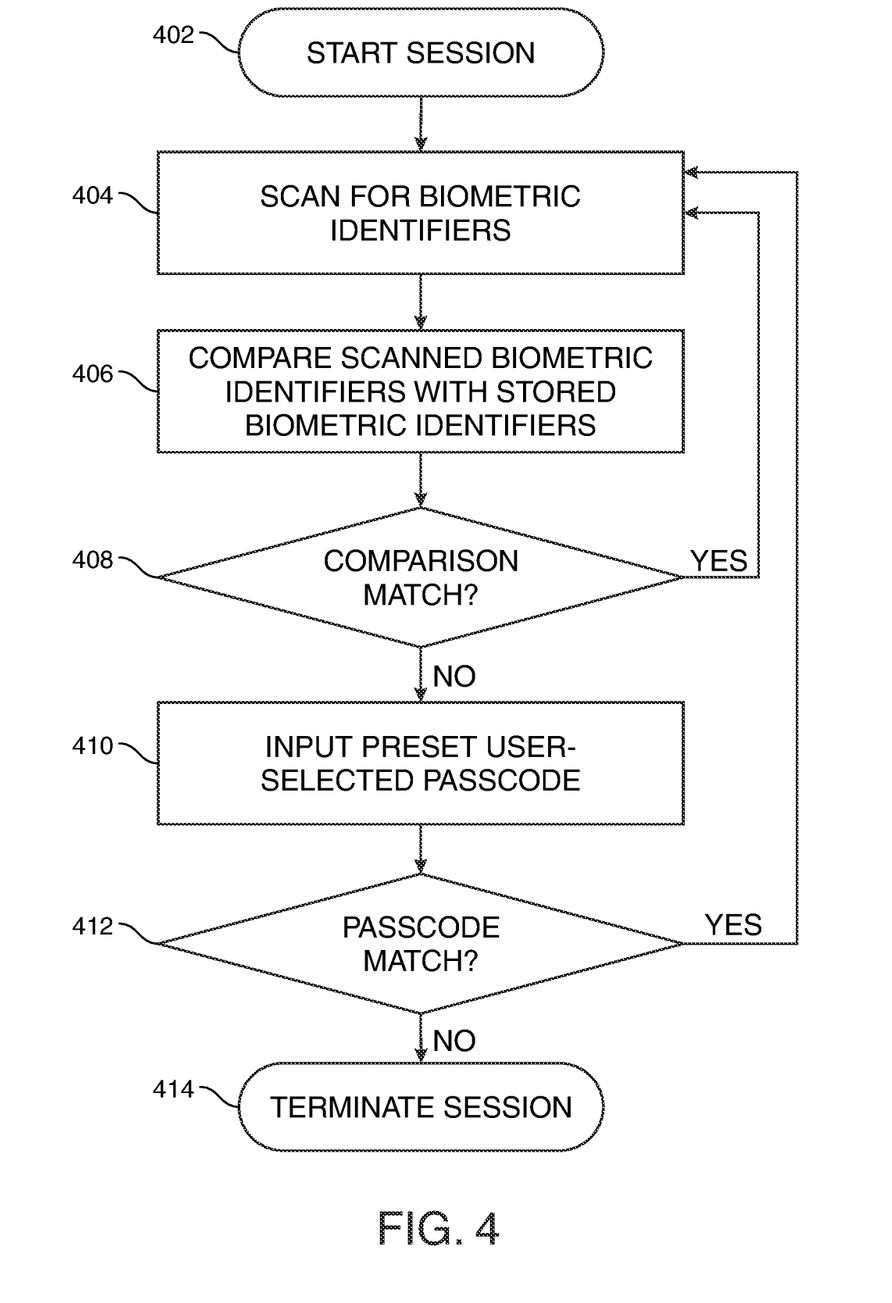
FIG. 4 shows still another illustrative diagram in accordance with principles of the invention.

FIG. 4 shows illustrative diagram of process 400. Process 400 may include one or more components included in FIG. 3. At step 402, user 304 may initiate a session. The session may be initiated at a user device, such as node 306. At step 404, the biometric scanner 310 may capture biometric identifiers of user 304. Step 404 may be executed after step 402. At step 406, after biometric scanner 310 captures biometric identifiers of user 304, biometric scanner 310 may compare the captured biometrics with the biometric identifiers stored in biometric authentication reference model 314.

At step 408, biometric scanner 310 may use the AI model to determine whether the captured biometric identifiers are a match for the stored biometric identifiers. When biometric scanner 310 confirms that the stored and captured biometric identifiers are a match, the continual biometric scan may go back to step 404 and repeat. When it is determined that the stored and captured biometric identifiers are not a match, then at step 410, node 306 may prompt user 304 to input a confirmation of a pre-selected passcode. In response to receiving a passcode response including a passcode confirmation, from user 304, the AI model may initiate step 412. The AI model may compare the confirmation passcode to the preset user-selected passcode. When the comparison indicates that the confirmation passcode matches the preset user-selected passcode, the continual biometric scan may go back to step 404 and repeat scanning for biometric identifiers. When the confirmation passcode does not match the preset user-selected passcode, the session may be terminated, as shown at step 414.

Figure 5:
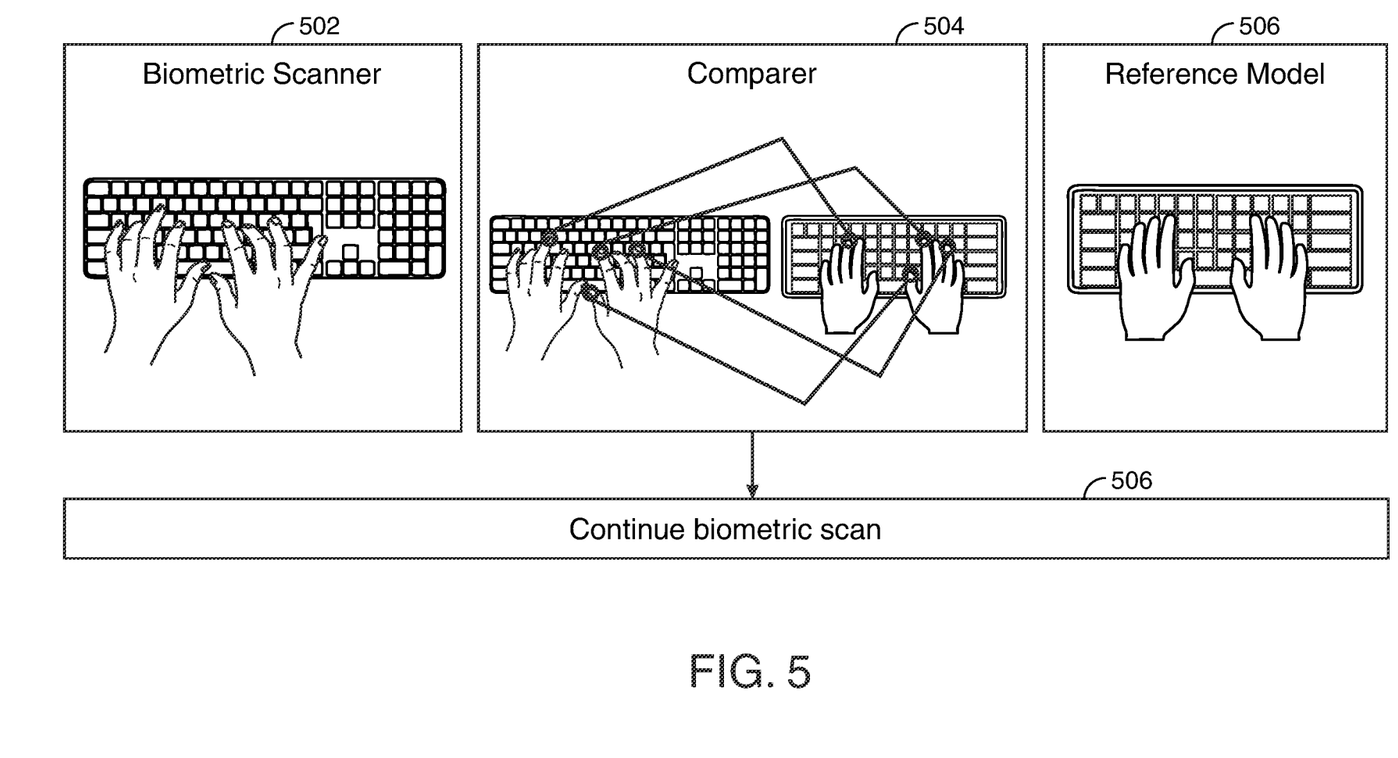
FIG. 5 shows yet another illustrative diagram in accordance with principles of the invention.

FIG. 5 shows illustrative diagram of biometric comparison 500. Biometric comparison 500 may include some or all of the components described in FIGS. 3 and 4. Biometric scanner 310 may compare the captured biometric identifiers with stored biometric identifiers using comparer 504. Biometric scanner 310 may capture biometric identifier 502 of user 304. Biometric identifier 502 may be a keystroke model. Biometric identifier 502 may be any suitable biometric identifier. Comparer 504 may compare biometric identifier 502 with corresponding biometric identifier 506 from biometric authentication reference model 314. Comparer 504 may identify comparison points between biometric identifier 502 and biometric identifier 506. Comparison points may include landmark elements that are identified as a match between biometric identifier 502 and biometric identifier 506. Comparer 504 may identify comparison points 508, 510, 512 and 514 between biometric identifier 502 and biometric identifier 506. Upon identifying comparison points 508, 510, 512 and 514, biometric scanner 310 may continue capturing biometric identifiers.

Figure 6:
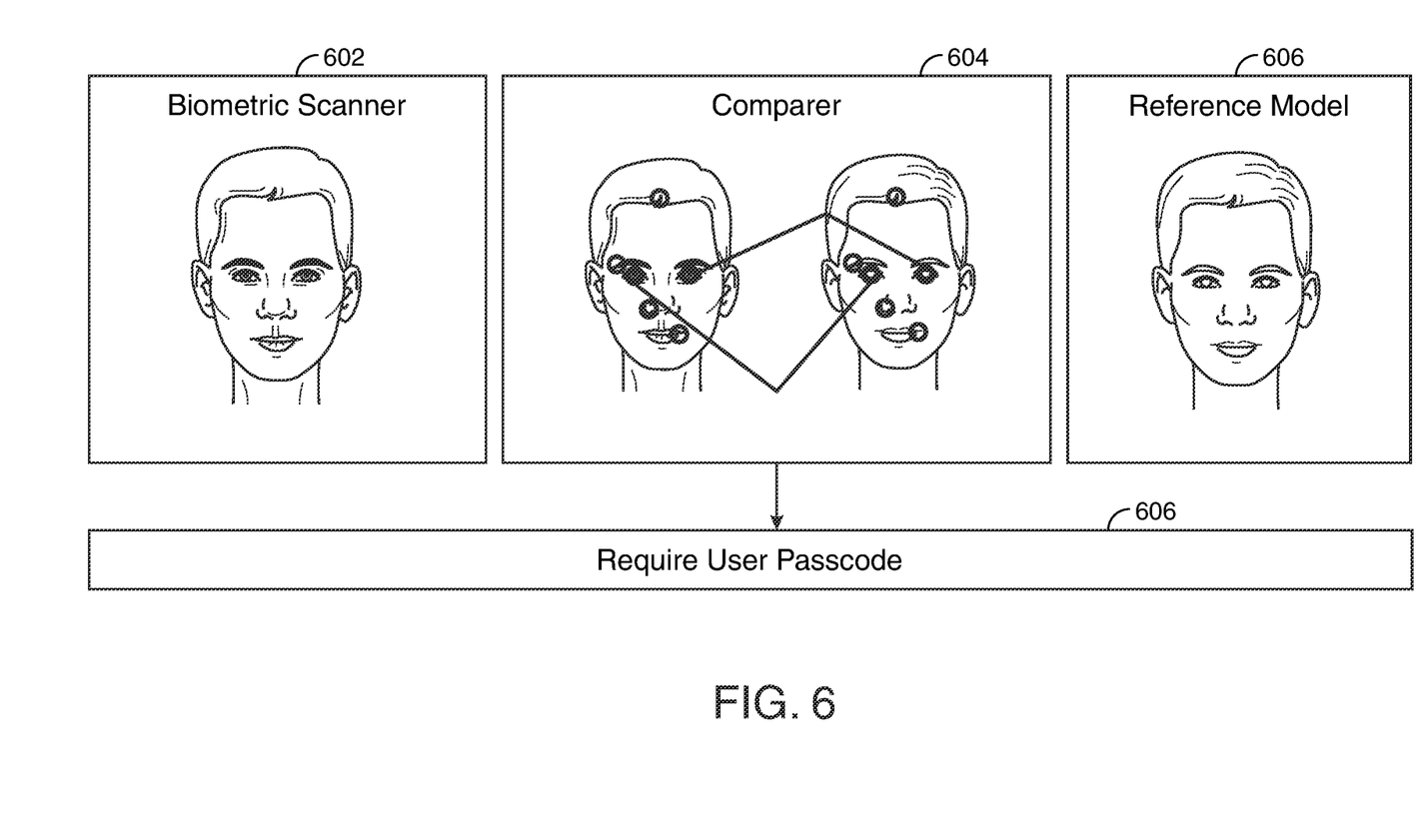
FIG. 6 shows still another illustrative diagram in accordance with principles of the invention.

FIG. 6 shows illustrative diagram of biometric comparison 600. Biometric comparison 600 may include some or all of the components described in FIGS. 3 and 4. Biometric scanner 310 may compare the captured biometric identifiers with stored biometric identifiers using comparer 604. Biometric scanner 310 may capture biometric identifier 602 of user 304. Biometric identifier 602 may be a facial recognition model. Biometric identifier 602 may be any suitable biometric identifier. Comparer 604 may compare biometric identifier 602 with corresponding biometric identifier 606. Biometric identifier 606 may be retrieved from biometric authentication reference model 314. Comparer 604 may identify comparison points between biometric identifier 602 and biometric identifier 606. Comparison points may include landmark elements that are identified as a match between biometric identifier 602 and biometric identifier 606. Comparer 604 may identify comparison points 608 and 610, that may be used to compare biometric identifier 602 and biometric identifier 606. In response to identifying comparison points 608 and 610, biometric scanner 310 may request a passcode from user 304 to authenticate user 304.

Figure 7:
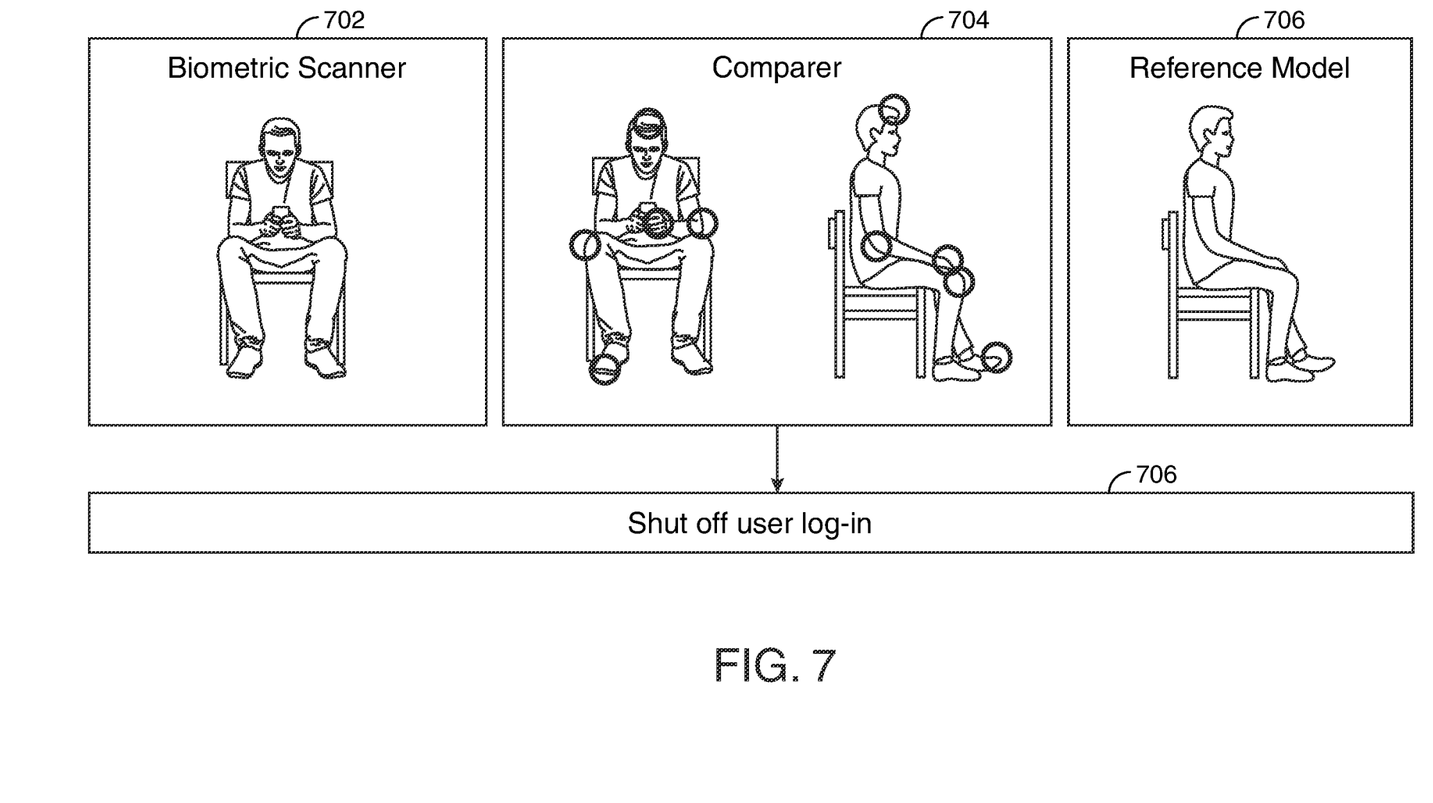
FIG. 7 shows yet another illustrative diagram in accordance with principles of the invention.

FIG. 7 shows illustrative diagram of biometric comparison 700. Biometric comparison 700 may include some or all of the components described in FIGS. 3 and 4. Biometric scanner 310 may compare the captured biometric identifiers with stored biometric identifiers using comparer 704. Biometric scanner 310 may capture biometric identifier 702 of user 304. Biometric identifier 702 may be a posture model. Biometric identifier 702 may be any suitable biometric identifier. Comparer 704 may compare biometric identifier 702 with corresponding biometric identifier 706 from biometric authentication reference model 314. Comparer 704 may identify comparison points between biometric identifier 702 and biometric identifier 706. Comparison points may include landmark elements that are identified as a match between biometric identifier 702 and biometric identifier 706. Comparer 704 may fail to identify any comparison points between biometric identifier 702 and biometric identifier 706. In response to failure to identify any comparison points, biometric scanner 310 may terminate the session.

Figure 8:
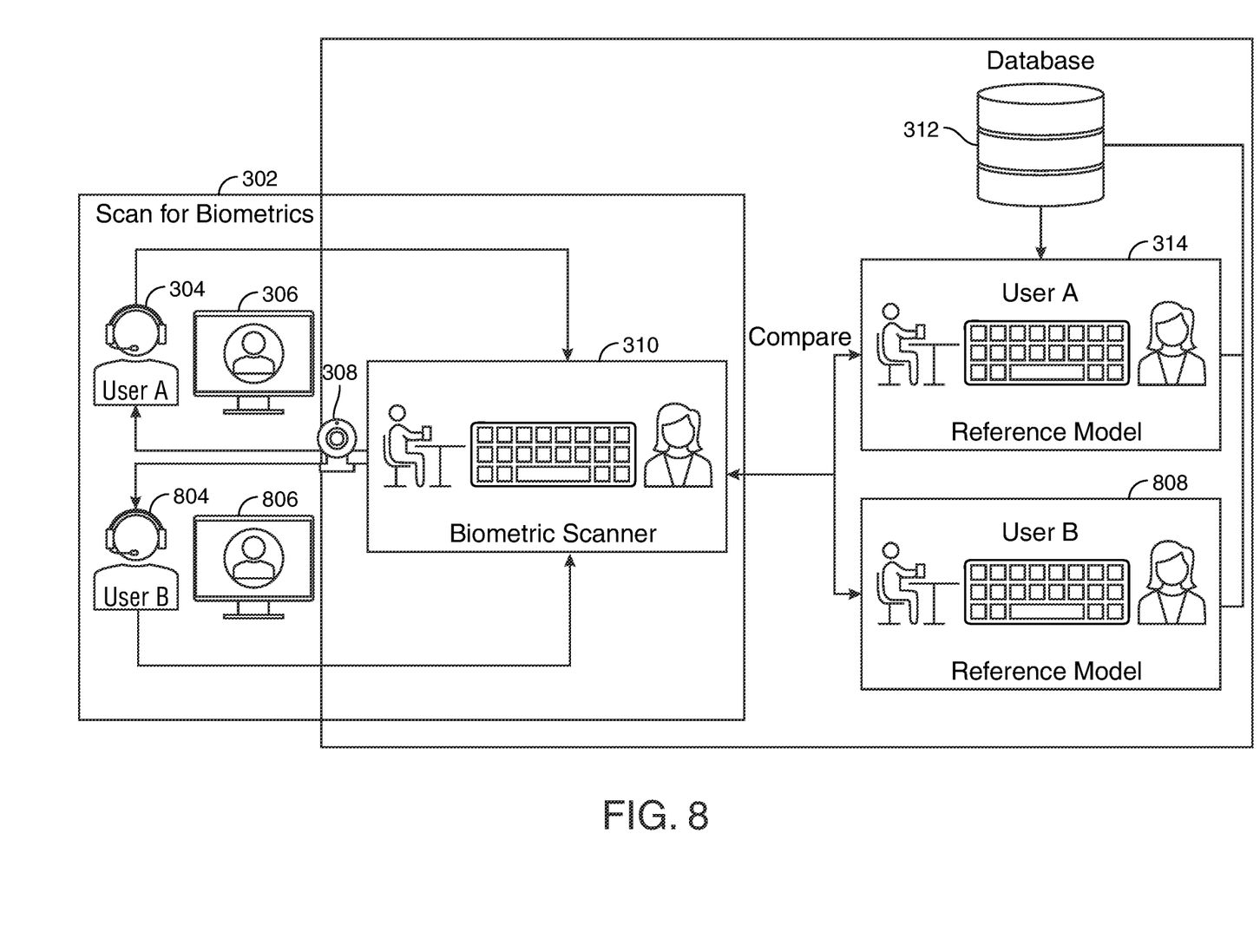
FIG. 8 shows yet another illustrative diagram in accordance with principles of the invention.

FIG. 8 shows illustrative diagram of process 800. Process 800 may include some or all of the components described in FIGS. 3 and 4. User 304 may be a first user. User 804 may be a second user. Biometric authentication reference model 314 may be a first biometric authentication reference model. Biometric authentication reference model 314 may be associated with user 304. Biometric authentication reference model 808 may be a second biometric authentication reference model. Biometric authentication reference model 808 may be associated with user 804. Biometric scanner 310 may compare captured biometrics with both biometric authentication reference models 314 or 808. The comparison may determine if the user is user 304 and/or if the user is user 808. Biometric scanner 310 may detect a switch between user 304 and user 808 during a session. Because users 304 and 308 are both authenticated users, biometric scanner 310 may enable the session to continue.

Thus, methods and apparatus for CONTINUAL BIOMETRIC AUTHENTICATION are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for continual biometric authentication of a user on a user device, the method comprising:
    creating, for a user, a biometric authentication reference model, said creating comprising:
        instantiating an instance of a biometric authentication application on a user device, the user device associated with the user;
        scanning, using the user device, a plurality of biometric identifiers, the plurality of biometric identifiers being included in a plurality of biometric models, the plurality of biometric models including one or more of a posture model, one or more of a face recognition model, one or more of a retinal identification model and one or more of a keystroke model, the plurality of biometric identifiers associated with the user;
        combining the scanned plurality of biometric identifiers to create the biometric authentication reference model; and
        storing the biometric authentication reference model at a database associated with the user device;
    in response to an instantiation of a session by the user on the user device, initiating a continual biometric scan, the continual biometric scan capturing a plurality of biometrics identifiers of the user, the continual biometric scan executed until the session is terminated;
    randomly selecting, using an artificial intelligence model, a biometric model, from the plurality of biometric models;
    comparing captured biometric identifiers associated with the randomly selected biometric model to the biometric identifiers stored in the biometric authentication reference model, said comparing comprising identifying a number of comparison points between the captured biometric identifiers associated with the randomly selected biometric model and stored biometric identifiers;
    in response to determining that the number of identified comparison points is below a predetermined threshold number of comparison points, initiating a passcode request, said initiating comprising requesting from a user, confirmation of a preset user-selected passcode stored at the database;
    in response to receiving a passcode response from the user, comparing the passcode response with the preset user-selected passcode; and
    in response to determining that the passcode response does not match the preset user-selected passcode, terminating the session.

2. The method of claim 1 wherein the initiation of the continual biometric scan executes without intentional input from the user.

3. The method of claim 1 wherein the continual biometric scan further comprises:
    initiating a first biometric scan capturing biometric identifiers of the user;
    comparing the captured biometric identifiers with the stored biometric identifiers;
    in response to confirming a match between a captured biometric identifier and a stored biometric identifier, generating a token, the token valid for a predetermined amount of time; and
    in response to a timeout of the token, initiating a second biometric scan.

4. The method of claim 3 wherein the timeout is preselected by the user.

5. The method of claim 1 further comprising in response to confirming a match of the passcode response to the preset user-selected passcode, updating the biometric authentication reference model, said updating comprising:
    instantiating an update instance of the biometric authentication application on the user device;
    scanning, using the user device, a plurality of updated biometric identifiers, the plurality of updated biometric identifiers associated with the user;
    combining the scanned plurality of updated biometric identifiers to create an updated biometric authentication reference model; and
    storing the updated biometric authentication reference model at the database.

6. The method of claim 1 wherein the user device includes one or more sensors configured to capture one or more of biometric identifiers.

7. A method for continual biometric authentication of a user on a user device, the method comprising:
    creating, for a first user, a first biometric authentication reference model, the creating comprising:
        instantiating a first instance of a biometric authentication application on a user device associated with the first user and a second user;
        scanning, using the user device, a first plurality of biometric identifiers of the first user, the first plurality of biometric identifiers being included in a first plurality of biometric models, the first plurality of biometric models including one or more of a posture model, one or more of a face recognition model, one or more of a retinal identification model and one or more of a keystroke model; and
        combining the first plurality of biometric identifiers to create the first biometric authentication reference model;
    storing the first biometric authentication reference model at a database accessible to the user device;
    creating, for the second user, a second biometric authentication reference model, the creating comprising:
        instantiating a second instance of a biometric authentication application on the user device;
        scanning, using the user device, a second plurality of biometric identifiers of the second user, the second plurality of biometric identifiers being included in a second plurality of biometric models, the second plurality of biometric models including one or more of a posture model, one or more of a face recognition model, one or more of a retinal identification model and one or more of a keystroke model; and combining the second plurality of biometric identifiers to create the second biometric authentication reference model;

storing the second biometric authentication reference model at the database;

in response to an instantiation of a session on the user device, determining that the session was initiated by the first user;

in response to determining the session was initiated by the first user, initiating a first continual biometric comparison, the first continual biometric comparison comprising:

randomly selecting a biometric model from the first plurality of biometric models; and comparing a captured biometric identifier included in the randomly selected biometric model to a corresponding biometric identifier included in the first plurality of biometric identifiers; and in response to determining that the second user has replaced the first user during the session, initiating a second continual biometric comparison, the second continual biometric comparison comprising:

randomly selecting a biometric model from the second plurality of biometric models; and comparing a captured biometric identifier included in the randomly selected biometric model to a corresponding biometric identifier included in the second plurality of biometric identifiers.

8. The method of claim 7 wherein the initiating of the first continual biometric comparison and the second continual biometric comparison executes without intentional input from the first or second user.

9. The method of claim 7 wherein determining that the session was initiated by the first user further comprises:

receiving from a user, a passcode message, the passcode message including a passcode specific to the first user;

comparing the passcode message with a stored passcode reference of the first user; and in response to identifying that the passcode included in the passcode message matches the stored passcode reference, determining that the user is a first user.

10. The method of claim 7 wherein determining that the second user has replaced the first user further comprises:

detecting that a number of comparison points between the captured biometric identifier and the corresponding biometric identifier included in the first plurality of biometric identifiers is below a predetermined threshold number of comparison points;

initiating a second biometric scan of the user;

comparing the captured biometric identifier from the second biometric scan with the corresponding biometric identifier included in the second plurality of biometric identifiers; and in response to detecting that a number of comparison points between the captured biometric identifier from the second biometric scan and the corresponding biometric identifier included in the second plurality of biometric identifiers is above a predetermined threshold number of comparison points, determining that the second user replaced the first user.

11. The method of claim 7 wherein the user device includes one or more sensors configured to capture one or more biometric identifiers.

12. Apparatus for executing a continual biometric authentication of a user on a user device, the apparatus comprising:

a processor;

one or more sensors in electronic communication with the processor, the one or more sensors configured to capture biometric identifiers of a user, an authentication model run by the processor configured to:

execute a biometric authentication application;

scan, using the one or more sensors, a plurality of biometric identifiers of a user, the plurality of biometric identifiers being included in a plurality of biometric models, the plurality of biometric models including one or more of a posture model, one or more of a face recognition model, one or more of a retinal identification model and one or more of a keystroke model; and combine the plurality of biometric identifiers to create a biometric authentication reference model of the user;

a database configured to store the biometric authentication reference model;

wherein the processor is further configured to instantiate a session, the session initiated by a user, the processor further configured to:

instruct the one or more sensors to execute a continual biometric scan and to continue the scan until the session is terminated;

receive from the one or more sensors, captured biometric identifiers;

execute an algorithm to:

randomly select, using an artificial intelligence model, a biometric model, from the plurality of biometric models;

compare captured biometric identifiers associated with the randomly selected biometric model to the biometric identifiers stored in the biometric authentication reference model; and identify a number of comparison points between the captured biometric identifiers associated with the randomly selected biometric model and stored biometric identifiers;

when the number of identified comparison points is determined by the algorithm to be below a predetermined threshold number, initiating a passcode request on a graphical user interface ("GUI") to confirm a preset user-selected passcode stored at the database;

in response to an input of a passcode response on the GUI, compare the passcode response with the preset user-selected passcode; and terminate the session in response to a determination that the passcode response does not match the preset user-selected passcode.

13. The apparatus of claim 12 wherein processor's instantiation of the continual biometric scan is instantiated without intentional input from the user.

14. The apparatus of claim 12 wherein the processor is further configured to:

initiate a first biometric scan configured to capture biometric identifiers of the user;

compare the captured biometric identifiers with stored biometric identifiers;

in response to a confirmation of a match between a scanned biometric identifier and a stored biometric identifier, generate a token, the token configured to be valid for a predetermined amount of time; and in response to a timeout of the token, initiate a second biometric scan.

15. The apparatus of claim 14 wherein the timeout is pre-selected by the user.

\* \* \* \* \*